United States Patent
Nowatzki

(10) Patent No.: US 9,329,883 B2
(45) Date of Patent: May 3, 2016

(54) POST-EXECUTION INSTRUCTION TRACING OF VIRTUALIZED INSTRUCTIONS

(71) Applicant: Thomas Nowatzki, Roseville, MN (US)

(72) Inventor: Thomas Nowatzki, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 178 days.

(21) Appl. No.: 14/064,704

(22) Filed: Oct. 28, 2013

(65) Prior Publication Data

US 2015/0121365 A1     Apr. 30, 2015

(51) Int. Cl.
G06F 9/455 (2006.01)
G06F 9/30 (2006.01)
G06F 11/30 (2006.01)
G06F 9/44 (2006.01)

(52) U.S. Cl.
CPC ........ *G06F 9/45533* (2013.01); *G06F 9/30072* (2013.01); *G06F 11/30* (2013.01); *G06F 9/4425* (2013.01)

(58) Field of Classification Search
CPC .................................................. G06F 11/3636
See application file for complete search history.

(56) References Cited

U.S. PATENT DOCUMENTS

2006/0026577 A1* 2/2006 Dinechin et al. ............... 717/148
2012/0198122 A1* 8/2012 Abdallah .......................... 711/3

OTHER PUBLICATIONS

Dube et al., A Tool for Scalable Profiling and Tracing of Java and Native Code Interactions, Sep. 8, 2011, IEEE, Quantitative Evaluation of Systems (QEST), 2011 Eighth International Conference, p. 37-46.*

* cited by examiner

*Primary Examiner* — Emerson Puente
*Assistant Examiner* — Steven Do
(74) *Attorney, Agent, or Firm* — Richard J. Gregson

(57) ABSTRACT

Systems and methods for tracing an emulated execution order of non-native instructions based on natively executing code on a computing system having a native instruction set architecture are provided. One method includes, during emulated execution of non-native program code, maintaining a jump history in the computing system, the jump history including a listing of non-native jump instructions for which execution is emulated in the computing system. The method includes, for each of the non-native jump instructions included in the jump history, accessing non-native program code including the non-native instructions to determine one or more non-native instructions executed between the non-native jump instruction and a last-executed non-native jump instruction, and aggregating the non-native jump instruction and the one or more non-native instructions into an instruction trace.

20 Claims, 14 Drawing Sheets

POST-EXECUTION INSTRUCTION TRACING OF VIRTUALIZED INSTRUCTIONS

TECHNICAL FIELD

The present application relates generally to computing system performance monitoring. In particular, the present application relates to monitoring and assessing performance in executing virtualized instructions, and in particular establishing a post-execution instruction trace of such instructions.

BACKGROUND

Computing systems perform tasks by executing machine-readable instructions having a specific, known format to that computing system. Such a format, or instruction set architecture, defines the types of instructions that the computing system is capable of performing, and defines an expected output structure for results of that execution. This can include, for example, the set of commands used by the computing system, the memory addressing schemes used, data bit definitions, and various other features.

It can be important, when creating software to be executed on a particular computing system, to determine the expected performance of that software on the computing system. For example, if a particular software system must complete its execution in a prespecified amount of time, it may be important to know if such execution is reasonable. Furthermore, by assessing an amount of time it takes, either on average on in a specific instance, for different instructions or instruction types to execute, a designer of either the hardware or software system can isolate and improve upon performance issues in the hardware or software.

Furthermore, increasingly, computing systems are being used on a time-shared basis, in particular for enterprise-class, large-scale computing tasks, or for tasks For example, many cloud computing systems operate on a time-shared basis in which a particular compute load and data bandwidth is provided to a particular user or client. In these cases especially, it can be important to know the expected performance of a particular workload, to know what computing resources are required for its execution, and how best to apportion resources to different workloads. In cases where computing resources are leased to third parties for use, it is important for the lessor of computing resources to know the performance of specific physical computing resources for different types of workloads, so that lessor knows what is being leased and its value relative to the workload (e.g., whether the resources being leased have a competitive advantage over unshared, privately-managed systems of the would-be lessee, or competitor leased systems.

Software systems currently exist which are designed to provide such performance assessments. For example, VTune software from Intel Corporation of Sunnyvale, Calif., provides an analysis of the particular hardware instructions that are executed, and their frequency of execution and average execution time. VTune also provides an ability to perform an instruction trace of the hardware instructions that are performed based on execution of a particular software package. Additionally, for hardware performance, computing systems exist which are capable of emitting statistics regarding the native machine instructions executed and time of execution, as well as many other metrics such as number of instructions retired in a given amount of time, cache hit rates and other caching statistics, memory usage, and other metrics. However, such native hardware software systems are not without disadvantages.

In one example where performance tuning systems are inadequate is in the case of virtualized systems. Virtualized systems generally refer to systems which have some type of virtualization layer executing on the physical hardware resources, and which can be used to allow for greater flexibility in execution of software packages on those same physical hardware resources. This can allow such systems to execute software packages written for a different instruction set architecture incapable of direct execution on the available hardware resources (i.e., a "non-native instruction set architecture"), or simply written to be executed at a higher abstraction layer as compared to being written for direct execution on the available hardware resources. In such systems, the virtualization layer, which can take the form of a hypervisor or other translation system, defines the manner of executing the hosted software package on the physical computing resources. This virtualization layer can be written simply as a translator, or in some cases can virtualize a different, non-native instruction set architecture, including memory model, addressing, instruction set, register set, and other typical architectural features. This may be the case in current cloud-based computing systems which can host workloads written for specialized processors on commodity hardware systems.

In such cases, existing performance assessment packages do not provide adequate focus on performance assessment, because it is not possible for such systems to distinguish between instructions performed by the virtualization layer as "overhead" or housekeeping tasks, and those instructions performed by the virtualization layer that are directly associated with a particular instruction. Furthermore, because at different times the virtualization layer may translate hosted (e.g., non-native) instructions differently, there may be no direct correspondence between one or more hosted instructions and one or more native instructions that are directly executed on the computing system. Furthermore, a virtualization layer may cause the virtualized or hosted instructions to be retired out of order, particularly if no data dependencies between those instructions exist. Additionally, in time-sharing situations, it may be the case that a particular resource is in use by a different virtualized software system, or may be available in hardware but not used by a particular virtualization layer, or may trigger an interrupt required to be handled by either a host system or the virtualization layer, thereby changing execution performance of the hosted software system between execution runs. Finally, it could also be the case that incorporation of a performance assessment features into virtualization software itself could adversely affect performance of the virtualization software by introducing unnecessary overhead into the translation and emulation process.

Accordingly, in view of the varying way in which execution of virtualized or hosted software can occur on a hosted and time-shared system, existing systems lack features capable of assessing instruction-level performance of the hosted software, and in particular the efficiency of execution of instructions in a hosted, non-native (but virtualized) system.

For these and other reasons, improvements are desirable.

SUMMARY

In accordance with the following disclosure, the above and other issues are addressed by the following:

In a first aspect, a method for tracing an emulated execution order of non-native instructions based on natively executing code on a computing system having a native instruction set architecture are provided. The method includes, during emulated execution of non-native program code, maintaining a jump history in the computing system, the jump history including a listing of non-native jump instructions for which execution is emulated in the computing system. The method includes, for each of the non-native jump instructions included in the jump history, accessing non-native program code including the non-native instructions to determine one or more non-native instructions executed between the non-native jump instruction and a last-executed non-native jump instruction, and aggregating the non-native jump instruction and the one or more non-native instructions into an instruction trace.

In a second aspect, a system for tracing an execution order of non-native instructions based on natively executing code on a computing system having a native instruction set architecture is disclosed. The system includes a jump history including a plurality of non-native jump instructions in emulated execution order, and virtualization software executing natively on the computing system. The virtualization software is configured to, for each of the plurality of non-native jump instructions, access non-native program code including the non-native instructions to determine one or more non-native instructions executed between the non-native jump instruction and a last-executed non-native jump instruction, and aggregate the non-native jump instruction and the one or more non-native instructions into an instruction trace.

In a third aspect, a computer-readable medium comprising computer-executable instructions is disclosed that, when executed on a computing system cause the computing system to perform a method of tracing an emulated execution order of non-native instructions based on natively executing code on a computing system having a native instruction set architecture. The method includes, during emulated execution of non-native program code, maintaining a jump history in the computing system, the jump history including a listing of non-native jump instructions for which execution is emulated in the computing system. The method includes, for each of the non-native jump instructions included in the jump history, accessing non-native program code including the non-native instructions to determine one or more non-native instructions executed between the non-native jump instruction and a last-executed non-native jump instruction, and aggregating the non-native jump instruction and the one or more non-native instructions into an instruction trace.

DETAILED DESCRIPTION

Figure 1:
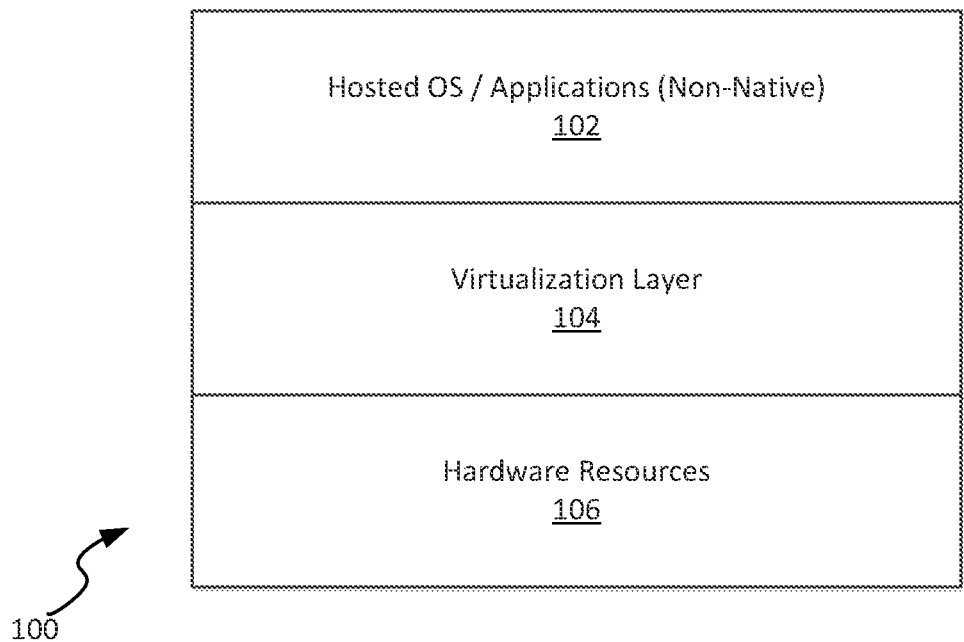
FIG. 1 is a logical view of a computing system hosting a virtualized, or hosted, software system, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for assessing performance of virtualized systems, and in particular to monitoring and assessing performance of a computing system and virtualization layer in executing virtualized instructions. The methods and systems disclosed herein provide an arrangement in which virtual instruction execution can be correlated to native, machine execution metrics, despite the fact that virtualization systems often reorder or cause unpredictable instruction times due to interrupts or other native architectural features not expected by the non-native software that is to be virtually executed on the system.

Referring now to FIG. 1, a logical view of a computing system 100 is show in which virtualized, or hosted, software systems are executing, according to an example embodiment. As illustrated, a software system 102 generally represents any non-native software system, and can include computer-executable instructions written for an instruction set architecture different than the one on which it will execute. For example, the software system 102 can be written and compiled for a particular instruction set architecture, such as a Unisys 2200 Series system architecture designed by Unisys Corporation of Blue Bell, Pa. Other instruction set architectures, such as a MIPS, ARM, or RISC instruction set architecture could be used as well.

The computing system 100 includes a hosted virtualization layer 104, executing on a hardware layer 106. The virtualization layer 104 generally includes software written to natively execute on the hardware layer 106, but which "understands" the software intended to be hosted on the computing system, i.e., software system 102. For example, the virtualization layer 104 can be any of a variety of types of emulators or hypervisors, or static/dynamic instruction translation systems that are capable of receiving compiled software written for a non-native instruction set, and determining one or more native instructions to provide corresponding functionality. Those one or more native instructions are then executed on the hardware layer 106 natively.

In connection with the present disclosure, the hardware layer 106 is generally a computing system having a native instruction set architecture other than the one associated with the software system 102, such that a virtualization layer 104 of some type is required. For example, the hardware layer can operate using any of a variety of x86 instruction sets, such as x86, x86-64, or IA64 instruction set architectures. In various embodiments, the hardware layer 106 can include one or more computing systems such as the one discussed below in connection with FIG. 6.

Generally, the software system 102 can include, for example, a hosted, non-native operating system and/or one or more non-native applications managed by that non-native operating system, collectively operating as a workload on the computing system 100. It is understood that, in various embodiments, more than one such software system 102 can execute on a set of shared hardware resources, using one or more instantiations of the virtualization layer 104.

In connection with such a virtualization arrangement as is discussed above, referring now to FIG. 2, a schematic view of a computing system 200 capable of executing according to the arrangement of FIG. 1 is shown. The computing system 200 includes a processor 202 and a memory 204. The processor 202 generally is a hardware component, i.e., an integrated circuit or programmable circuit configured to execute a predetermined set of program instructions, access memory in a particular way (e.g., using a particular type of physical or virtual addressing) and have one or more on-board memory or processing resources, such as a set of registers 206 and a cache memory 208. Based on the particular instruction set, registers 206, cache 208, and memory addressing arrangement defined by the processor's design, software instructions stored in the memory 204 can be written for native execution (i.e., decoding and execution by the hardware components).

Additionally, in some embodiments such as that shown, the processor 202 can include one or more performance counters 210 associated therewith, to provide statistics regarding various aspects of operation of the processor when executing such native instructions. For example, some central processing units currently available, such as those available from Intel Corporation of Sunnyvale, Calif., have embedded capabilities to determine various operational statistics of a processor, such as instructions executed (retired), number of cache hits, cache hit percentages, native processor cycles per instruction, native cache misses per instruction, and timestamps that allow total execution time of each instruction or group of instructions to be tracked. Furthermore, as explained in further detail below, each of these statistics can be localized to execution of specific non-native code using corresponding non-native jump instructions as statistical "goalposts", or boundaries at which statistical measures are taken, since such instructions can be detected within emulated software with little execution overhead.

The memory 204 generally relates to a memory subsystem, which can include, in various embodiments, one or more physical storage devices, such as RAM, solid state, and/or disk storage. In the embodiment shown, the memory 204 is configurable to store various types of native instructions and data, such as native data storage 212, native applications 214, a native operating system 216, and virtualization software 218. In various embodiments, the virtualization software 218 provides the virtualization layer 104 described above in connection with FIG. 1, and can be, for example any of a variety of emulator or translator systems. In a typical embodiment, the virtualization software 218 provides realtime translation of non-native instructions, for example on an instruction-by-instruction basis. In such an embodiment, the virtualization software 218 generally has a loop-based fetch-decode-execute structure, in which each non-native instruction is retrieved, decoded, and then a procedure is called that performs one or more native instructions that are the equivalent of the non-native instruction. In an alternative example embodiment, an at least partially static translation arrangement could be used such as are described in copending U.S. patent application Ser. No. 13/432,416, entitled "Event Logger for Just-In-Time Static Translation System", the disclosure of which is hereby incorporated by reference in its entirety.

In addition to the native instructions and data, the memory 204 can also store non-native instructions and data, for example as may be stored in one or more non-native partitions 220. The non-native partitions 220 generally can include a variety of analogous types of instructions and data typically required if the non-native instructions and data were stored on a different (and compatible) system for native execution. For example, the non-native partition as illustrated includes one or more non-native applications 222, a non-native operating system 224 configured to host the non-native applications, and an emulated storage space 226 which is addressable using the non-native instruction format. Additionally, a portion of the non-native partition 220 can be reserved, for example to emulate particular additional registers, cache, stack, or other non-native storage structures expected to be present in the non-native instruction set architecture (e.g., by the non-native operating system 224 and non-native applications 222).

It is noted that, in some cases, the virtualization software 218 can manage multiple such partitions 220, and can in some cases provide pre-translation of the non-native applications and/or data (e.g., applications 222, operating system 224, and data storage 226), for example in the case where the virtualization software 218 is implemented to pre-translate or real-time-translate the non-native applications and/or data. In the typical case of realtime translation, each of the non-native instructions included in the non-native applications 222 or operating system 224 can be parsed during execution by the virtualization software 218, which can call a corresponding function that performs the equivalent operation using machine instructions. In this arrangement, generally referred to as dynamic translation, each non-native instruction can be translated on an instruction-by-instruction basis based on established translation libraries managed by the virtualization software at the time of execution.

In the case of pretranslation, one or more blocks of translated data can be stored in the native data storage 212 by the virtualization software 218, and accessed by the virtualization software when particular virtualized code segments are reached in the non-native applications 222 or operating system 224. Such an arrangement is discussed generally in U.S. patent application Ser. No. 13/432,416 entitled "Event Logger for Just-In-Time Static Translation System", which was previously incorporated by reference in its entirety.

Additionally, and as discussed in further detail below, in various embodiments discussed herein the virtualization software 218 can be multithreaded, multitasking software. In example embodiments discussed below a main thread manages a fetch-decode/translate-emulated execution process, and separate threads used for extraction and processing of instruction and statistical information generated within the virtualization software and native hardware system (e.g., processor 202). This would allow separate tasks to be performed during execution of virtualized software to be translated/emulated, while also remaining minimally-invasive into a fetch-decode/translate-emulated execution process managed by a main thread of the software 218.

Figure 2:
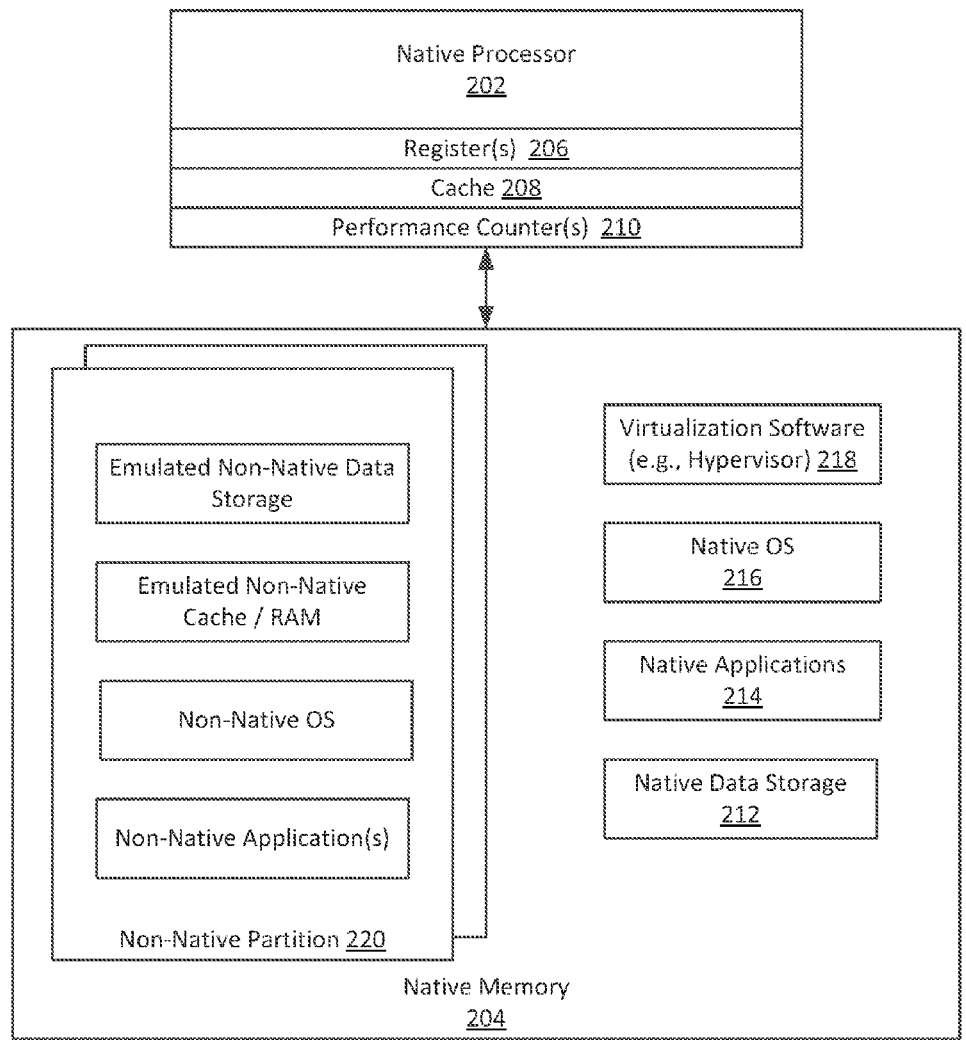
FIG. 2 is a schematic view of a computing system configured to logically operate according to the arrangement discussed with respect to the computing system of FIG. 1.
Figure 3:
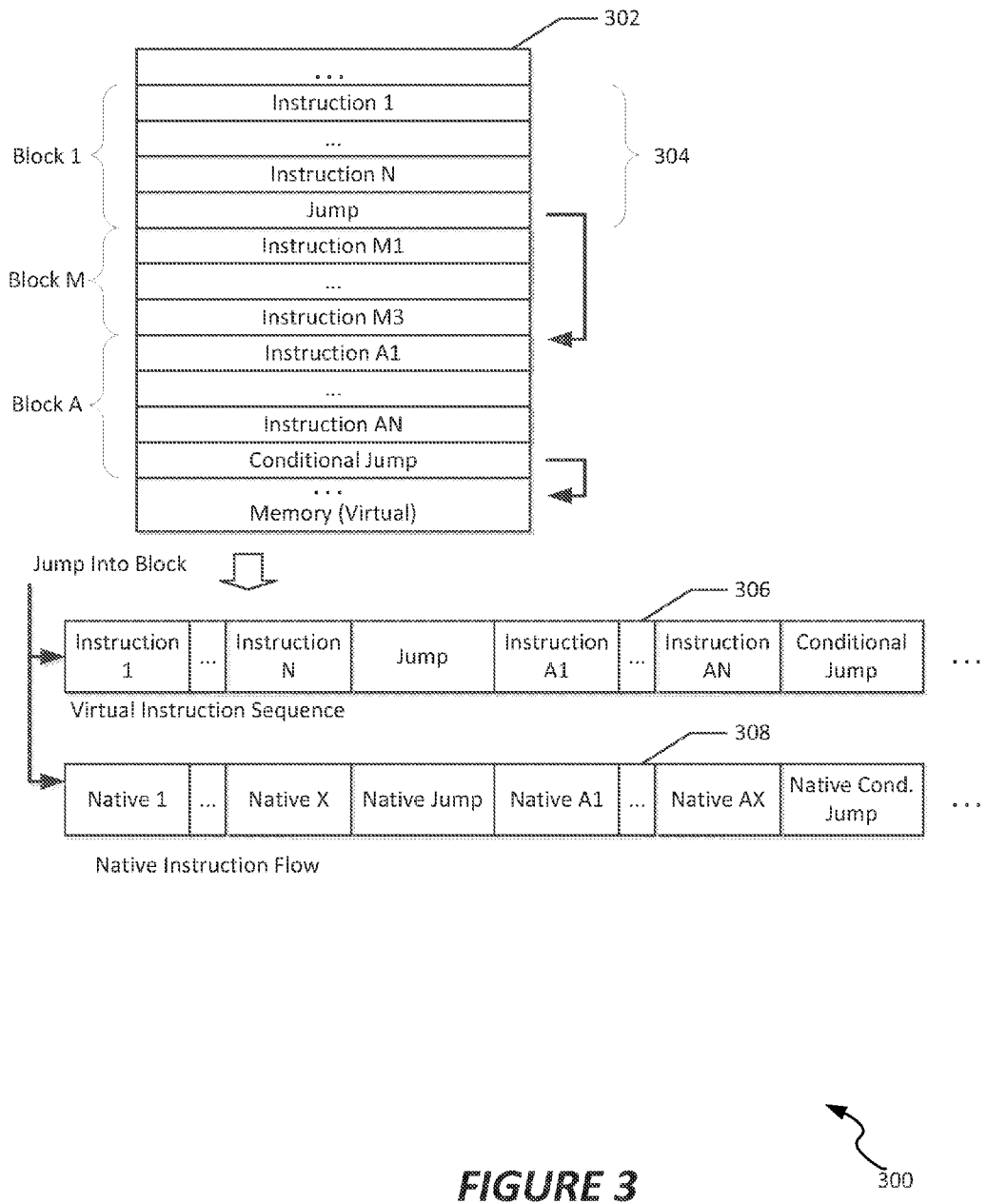
FIG. 3 is a logical diagram illustrating an arrangement for virtual software execution, according to an example embodiment.

Referring now to FIG. 3, a logical diagram illustrating an arrangement 300 for virtual software execution is shown according to an example embodiment. The arrangement 300 generally illustrates a logical progression of non-native instructions to executable instructions in a virtualized, or hosted, environment, such as described above in connection with FIGS. 1-2. In the embodiment shown, a set of virtual, or non-native, instructions, denoted as instructions 302 such as may be part of a non-native application 222, is to be executed on a native computing system. The non-native instructions 302 generally include various types of instructions, such as logical or arithmetic instructions, shift instructions, floating point instructions, or jump or branch instructions. Generally, these instructions can be categorized as either altering flow control (e.g., in the case of jump or conditional jump instructions) or not altering flow control. In some embodiments of the present disclosure, the instructions 302 can be separable into a plurality of instruction blocks 304. These instruction blocks 304 are generally separated based on a knowledge that each of the instructions in an instruction block will be executed consecutively, i.e., that any flow control instructions be included at the end of a block, and that a block begins, for example, at a branch or jump target such that flow through the block is generally performed on a start-to-finish basis, rather than there being possible circumstances where only a portion of a block is executed.

In connection with the instruction blocks, or alternatively on an instruction-by-instruction basis, during execution each instruction block can correspond to a set of translated native instructions. As such, during execution of the non-native instructions by virtualization software, a virtual instruction sequence 306 can have a corresponding native instruction sequence 308. In the embodiment shown, the virtual instruction sequence is shown as having instructions from 1 to N (e.g., instruction 1 to instruction N, or instruction A1 to instruction AN, etc.) followed by a jump or branch instruction. As illustrated, instruction A1 represents the beginning of a block, since it is a jump target from the Jump instruction at the end of "Block 1".

As noted above, although the virtual instruction sequence 306 is illustrated graphically as the same length as the native instruction sequence 308 corresponding to it, it is noted that this is merely a matter of graphical convenience in the Figure; generally, it is common for non-native and native instructions to not be direct analogues of each other, and as such, more than one native instruction may be required to perform the tasks recited in a non-native instruction, or vice versa. As such, where a block may include instructions 1-N and a jump instruction (e.g., Block 1 of FIG. 3), a native instruction flow will generally have a different number of native instructions (shown as native instructions 1-X). Generally, this can be accomplished in a variety of ways. For example, the virtual instruction sequence 306 can be translated to a native instruction sequence 308 using either static or dynamic binary translation, as mentioned above. Furthermore, and as previously mentioned, in some cases the non-native instructions may be either translated out of order by the virtualization software, or the native instructions may be executed out of order by the physical computing system, due to the architectural features of that native instruction set architecture (e.g., to take advantage of particular resources of the computing system.

Referring now to FIGS. 4A-4D, logical data flows are illustrated in which performance of virtualized, or non-native, instructions can be monitored, according to various embodiments of the present disclosure. In general, the logical data flows of FIGS. 4A-4D take advantage of both architectural features of existing native hardware (e.g., performance counters built in to existing microprocessors and/or chipsets), and illustrate ways to track sequences of non-native instructions that correspond to particular execution times, thereby isolating specific statistics to be associated with specific segments of non-native instructions. Generally, the logical data flows illustrated herein are managed at least in part by virtualization software, which resides at an interface between (and understands both) non-native instructions and native instructions. The virtualization software can also, in such embodiments, have access, via a native operating system or directly, to hardware performance counters available within the native hardware of the computing system on which the virtualized instructions are executed.

Figure 4A:
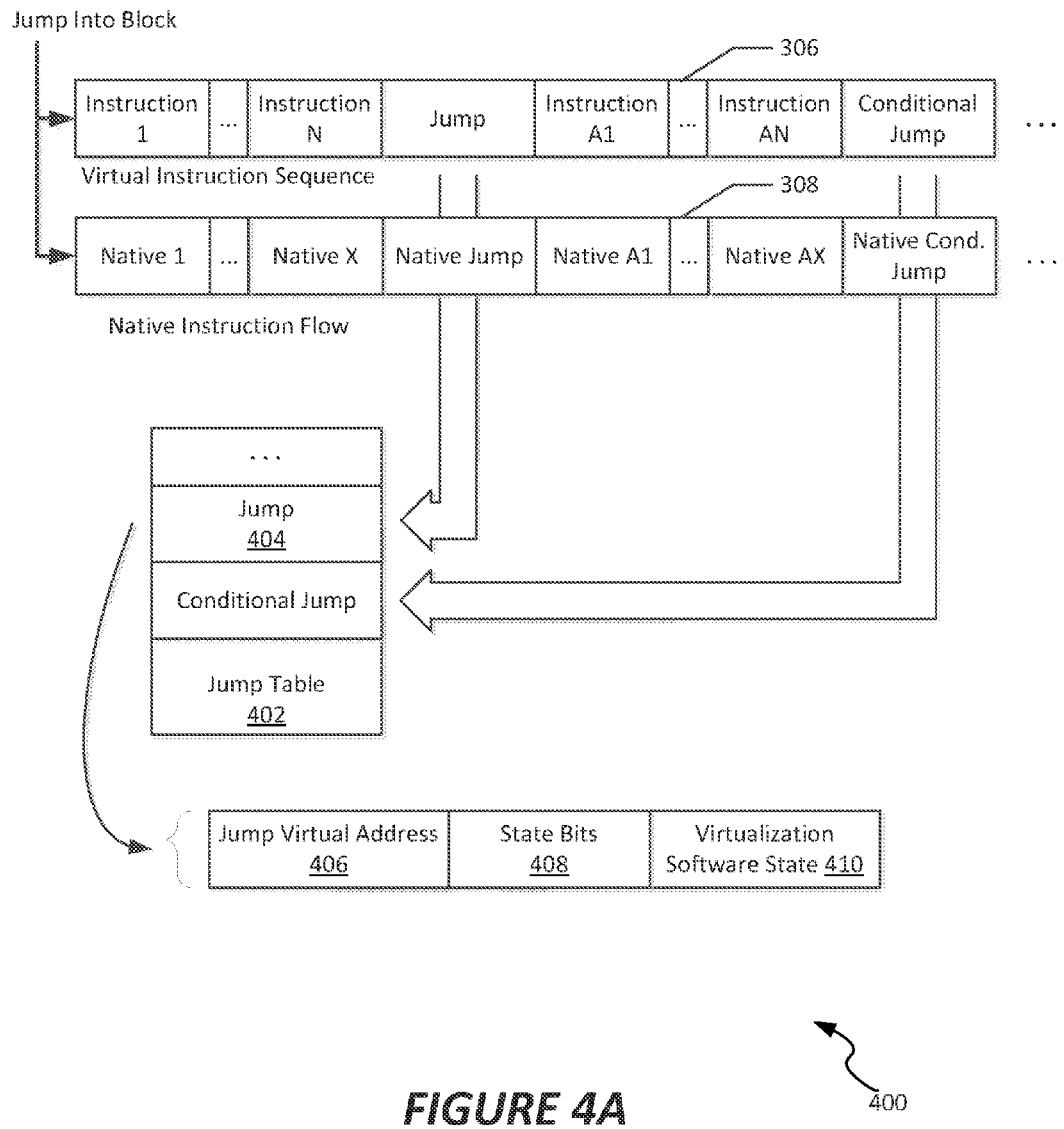
FIG. 4A is a logical data flow of a system for monitoring performance of virtualized instructions, according to an example embodiment of the present disclosure.

Referring first to FIG. 4A, a basic illustration of a data flow 400 is show in which a virtual instruction sequence 306 and its associated native instruction sequence 308 are provided. In this data flow 400, the virtual instruction sequence 306 is translated to a native instruction sequence 308, either on a static, block-by-block pretranslation basis, or during runtime on an instruction-by-instruction basis. As each of the instructions are translated, jump instructions are identified by the virtualization software. For example, a jump instruction can be detected at the end of a pretranslated block, or based on a runtime translation of a non-native opcode or emulated mode code configured to be translated to native instructions. The non-native jump instructions can then be stored in a jump history, such as jump table 402. The jump table 402 stores a sequence of jump entries 404, in the order encountered during execution of non-native applications.

The jump table can be built in many ways. In an example embodiment, the jump table is built by monitoring for any occurrence of non-consecutive virtual jump addresses in the parsed non-native instruction sequence. Each of the jump entries 404 in the jump table can include, for example, a virtual address 406 of the jump, a set of bits 408 describing a state of the non-native software system being emulated, and a further set of bits 410 describing a state of the virtualization software. Other fields can be incorporated into the jump table 402 as well. In an example embodiment, the jump table can also capture jump target addresses, useable to assist in reconstructing an instruction trace according to an example embodiment discussed in further detail below in connection with FIG. 5B.

The jump table 402 can be any length; however, in one embodiment, the jump table is a buffer including up to 256 jump table entries 404. In such an embodiment, the jump table 402 can be cyclically overwritten during execution of virtual instructions, and is populated by the main thread of the virtualization software.

The jump table 402 generally has a number of uses. For example, entries in the jump table are generally known to be correlated to a time at which a branch or flow control would occur in the native instruction sequence 308, because in either native or non-native code execution, jump instructions generally will be constrained such that they occur "in order"; in other words, all of the instructions occurring prior to a jump instruction must retire before that jump instruction. Accordingly, all of the native instructions that correspond to those non-native instructions will be similarly constrained relative to a native jump instruction corresponding to the non-native jump instruction.

Furthermore, and as explained in further detail below in connection with FIGS. 5A-5C, a state of the jump table 402 can be captured during execution, for post-execution generation of an instruction trace of the non-native instructions that are "executed" by the virtualization software, in the sense that native instructions performing analogous operations are in fact executed on the native computing system.

Figure 4B:
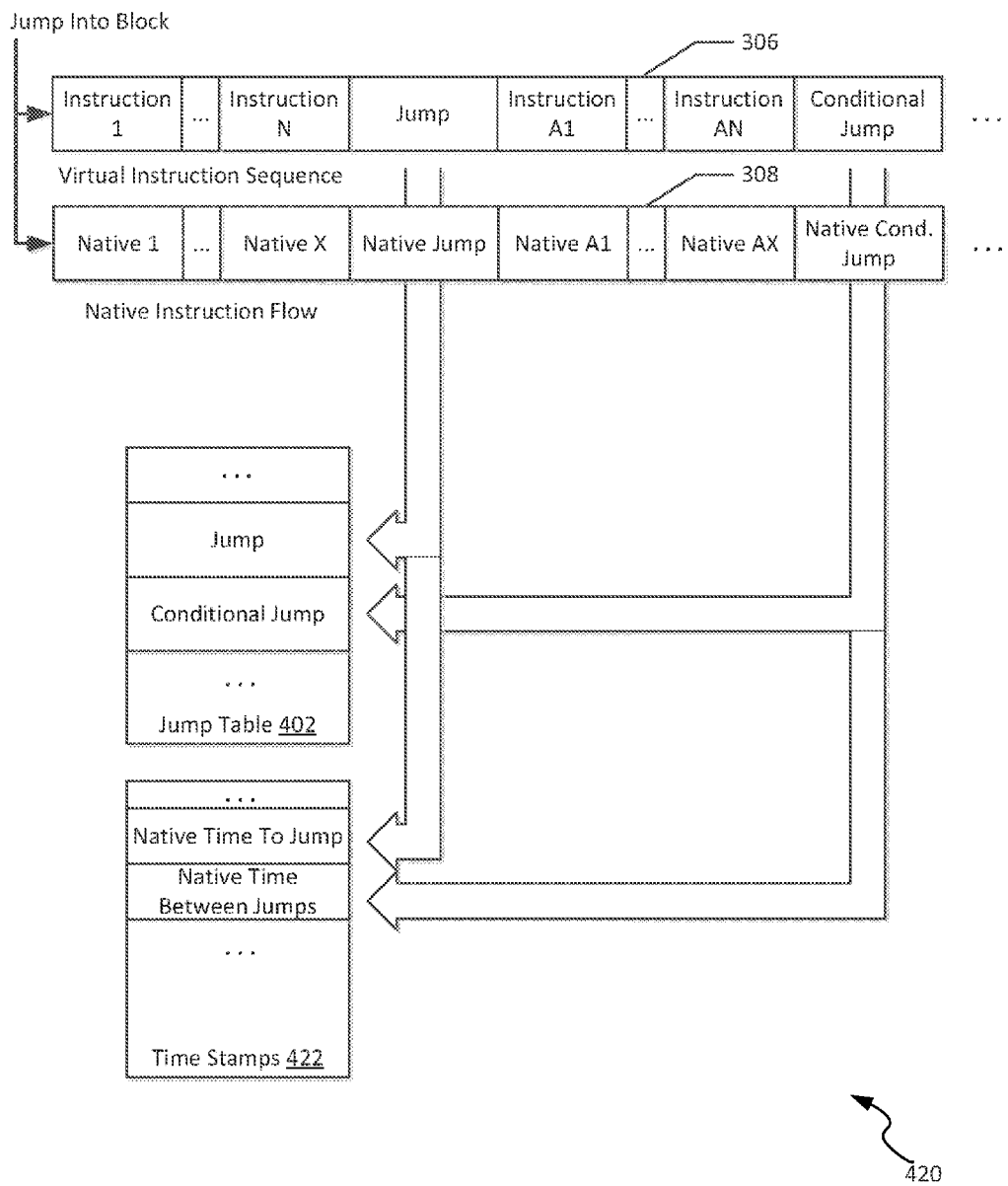
FIG. 4B is a logical data flow of a system for monitoring performance of virtualized instructions, according to a second example embodiment of the present disclosure.

Referring to FIG. 4B, a second example logical data flow 420 is shown in which performance of virtualized, or non-native, instructions can be assessed. In the logical data flow 420, an additional time stamp array 422 can be generated from the native instruction sequence 308, with time stamps being generated at each occurrence where a native jump occurs. Because the native jump will occur either (1) at the end of a pretranslated code block or (2) at a beginning and end of a called procedure for dynamically translating a non-native instruction, timestamps can be captured which represent execution of non-native instructions for a particular period of time (typically calculated based on a number of clock cycles and a clock frequency of the native processor) between adjacent jumps. Based on the correlation of native and non-native instructions at branch or jump positions, and based on the relative execution-order constraint of jump instructions, individual non-native instructions can be assessed for performance. That is, in the case of a single non-native instruction included within a procedure, the time difference between adjacent timestamps will correspond to the execution time of the procedure that is called to natively execute operations that correspond to the non-native instruction. Similarly, in the case of a set of non-native instructions within a block of pretranslated instructions, the time difference between adjacent timestamps will correspond to execution time for the block generally.

Figure 4C:
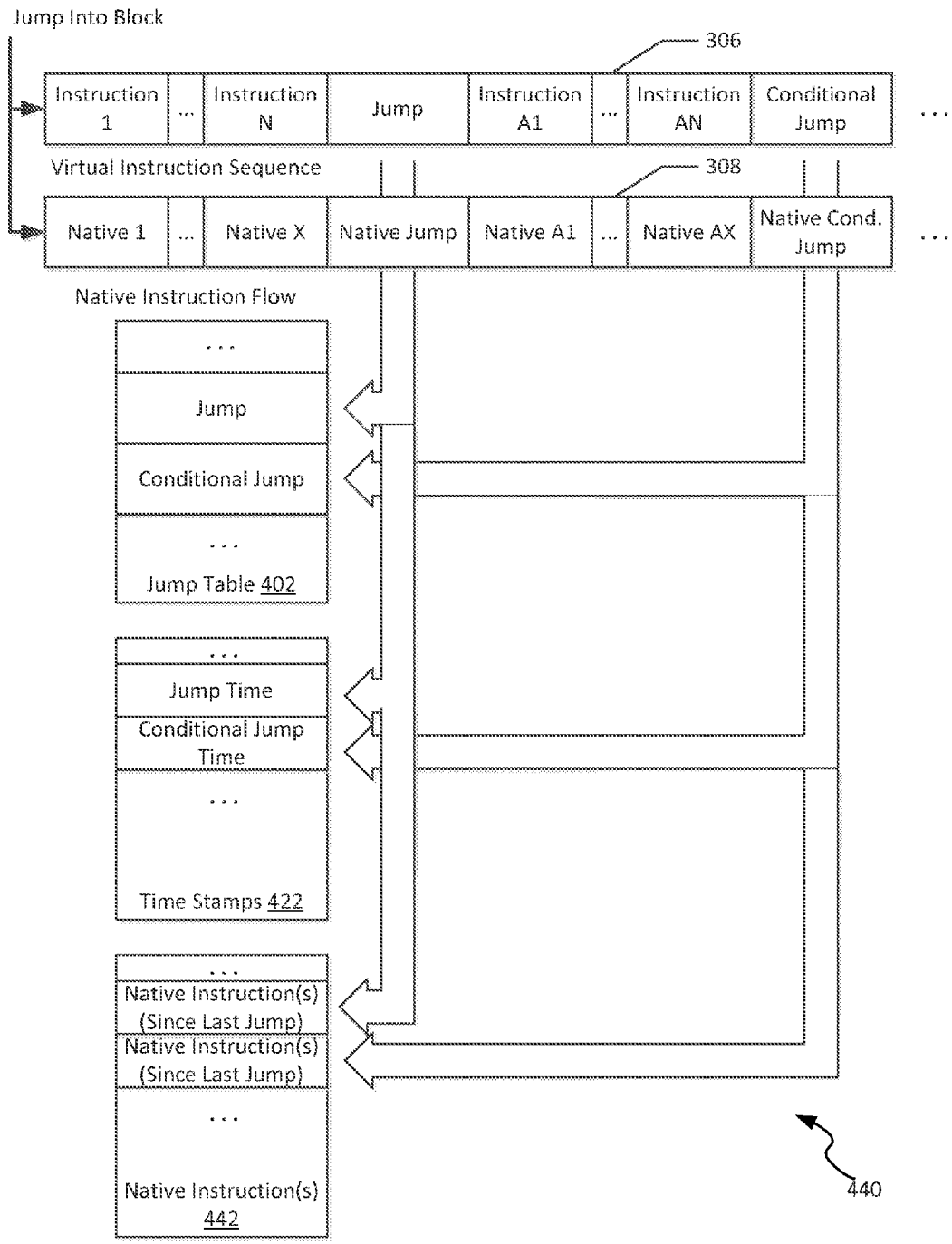
FIG. 4C is a logical data flow of a system for monitoring performance of virtualized instructions, according to a third example embodiment of the present disclosure.
Figure 4D:
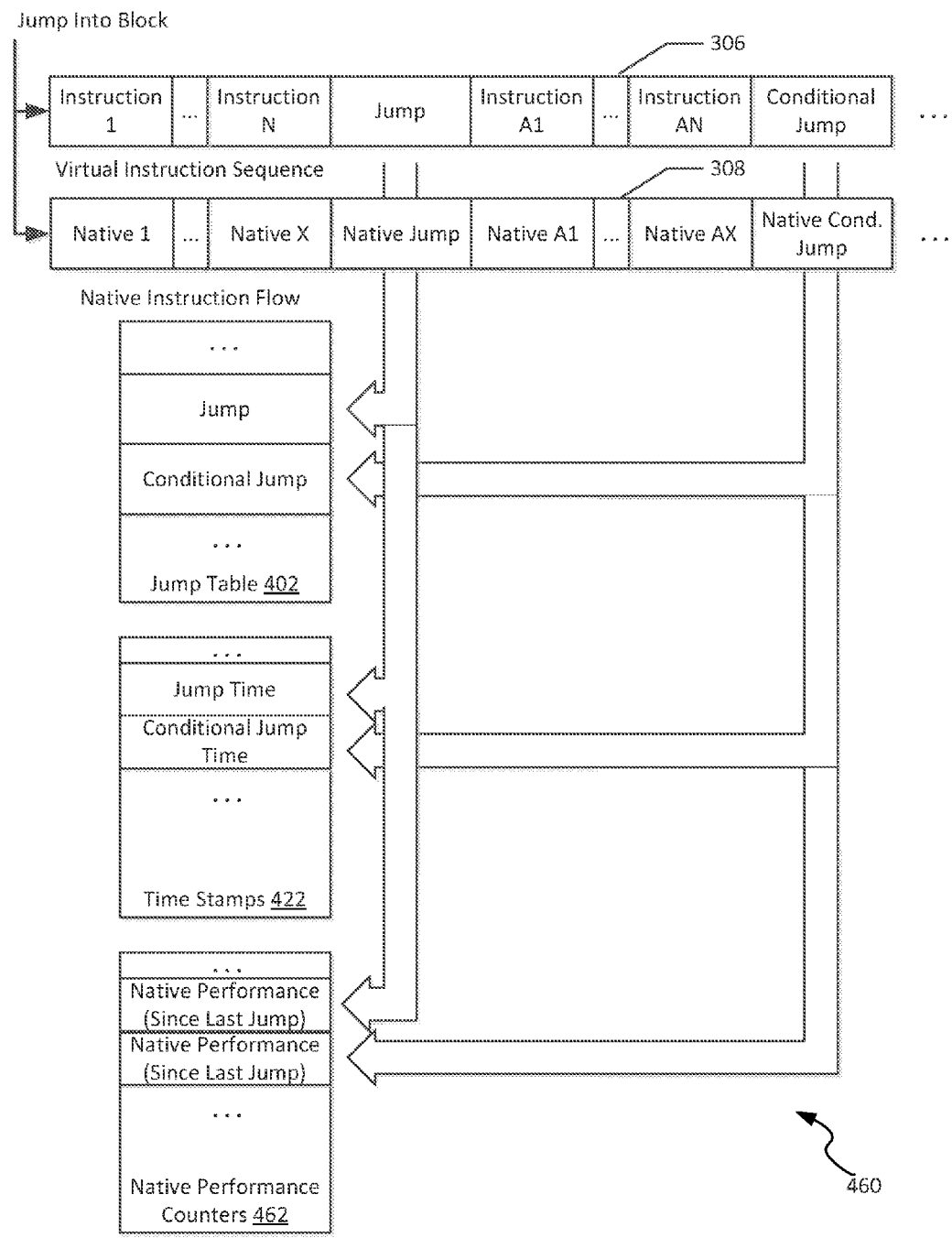
FIG. 4D is a logical data flow of a system for monitoring performance of virtualized instructions, according to a fourth example embodiment of the present disclosure.

Referring to FIGS. 4C and 4D, it is noted that in additional example logical data flows 440, 460, respectively, other types of data can be tracked in data structures. In FIG. 4C, data flow 440 illustrates the arrangement of FIG. 4B, but additionally includes an instruction count array 442 that maintains a count of native instructions that have retired since a last jump instructions. This count can be derived from performance counters of a native hardware system, such as are often embedded into processor architectures. By including this native instruction count, it is possible to determine an efficiency of the virtualization software by determining the correspondence between a number of non-native instructions included in the non-native instruction sequence 306 and the native instruction sequence 308 between adjacent jump instructions (e.g., the difference between the number of non-native instructions N and native instructions X for a given instruction sequence). Similarly, in logical data flow 460 of FIG. 4D, a table 462 of native performance counters can be used to capture additional metrics regarding the one or more native instructions. The table 462 can store any of a variety of "events" occurring in the native computing system, such as system events like interrupts or other occurrences that may affect or indicate performance issues.

It is noted that, referring to each of FIGS. 4A-4D, to minimize any potential performance degradation effect that may occur due to the performance monitoring itself, in preferred embodiments of the present disclosure the virtualization software is configured such that performance monitoring is only minimally invasive as to processing performance; that is, in such embodiments management of the jump table is all that is required of the primary thread, beyond its typical emulated execution tasks. In such circumstances, the virtualization software can be configured to monitor performance by spawning a separate thread used to sample and aggregate statistics and jump table entries into a separate storage location. This separate thread will be independent from the thread used to emulate or translate the non-native instructions, and only needs read access to the jump table. This separate thread can then be dedicated to a separate set of computing resources (e.g., a separate processor and memory) as compared to the virtualized execution to be monitored.

In general, it is noted that throughout the arrangements of FIGS. 4A-4D, each jump table entry 404 that is entered will have a one-to-one correspondence with a corresponding other statistical storage array, such as the time stamp array 422, instruction count array 442, or table 462 of native performance counters. In some embodiments, additional timestamps or other statistics can be captured during execution at times other than those associated with jump/branch instructions, but will typically not be captured for analysis according to the methods and systems discussed herein.

Figure 5A:
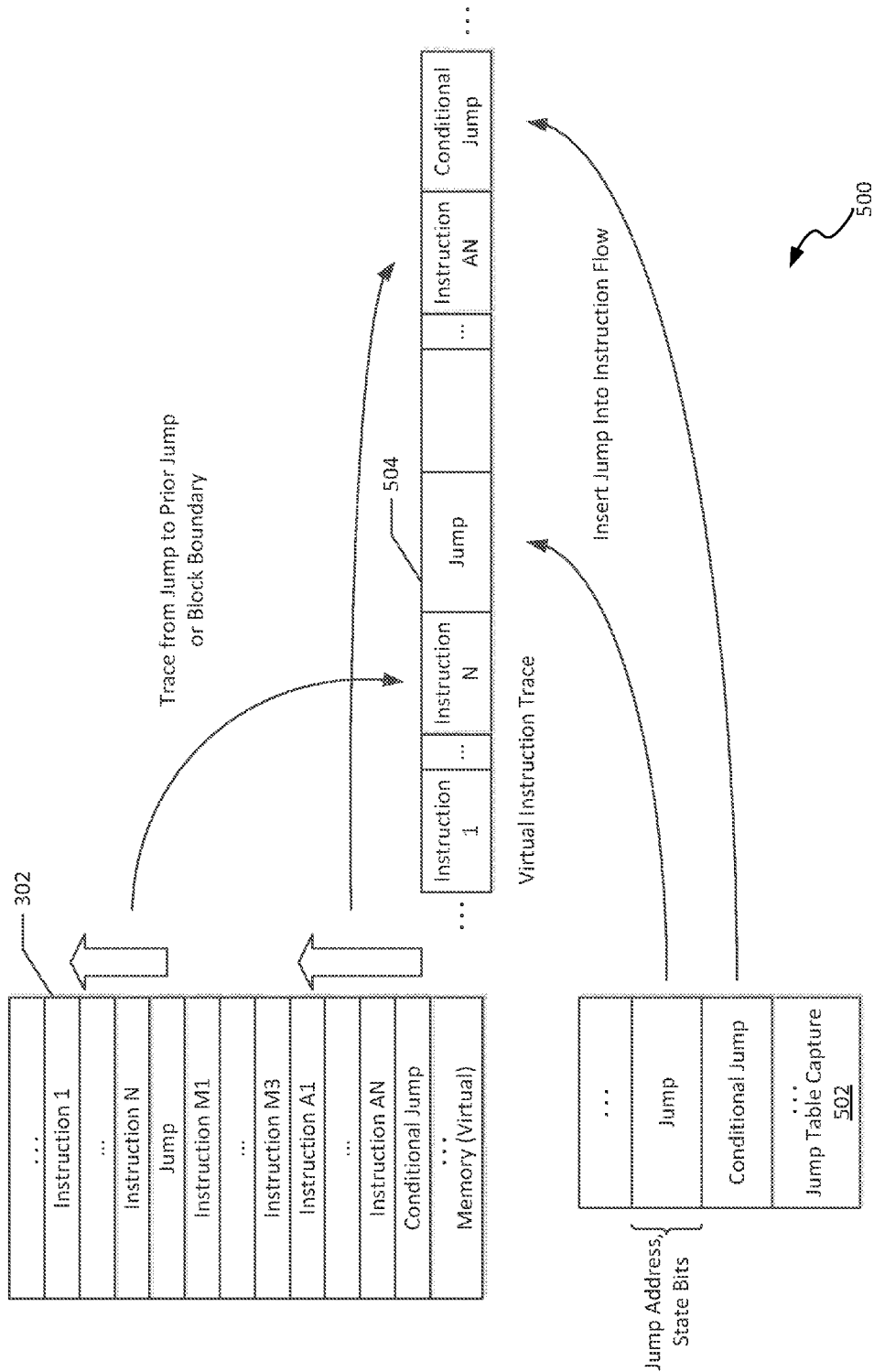
FIG. 5A is a logical data flow of a system for generating an instruction trace of virtualized instructions, according to an example embodiment of the present disclosure.
Figure 5B:
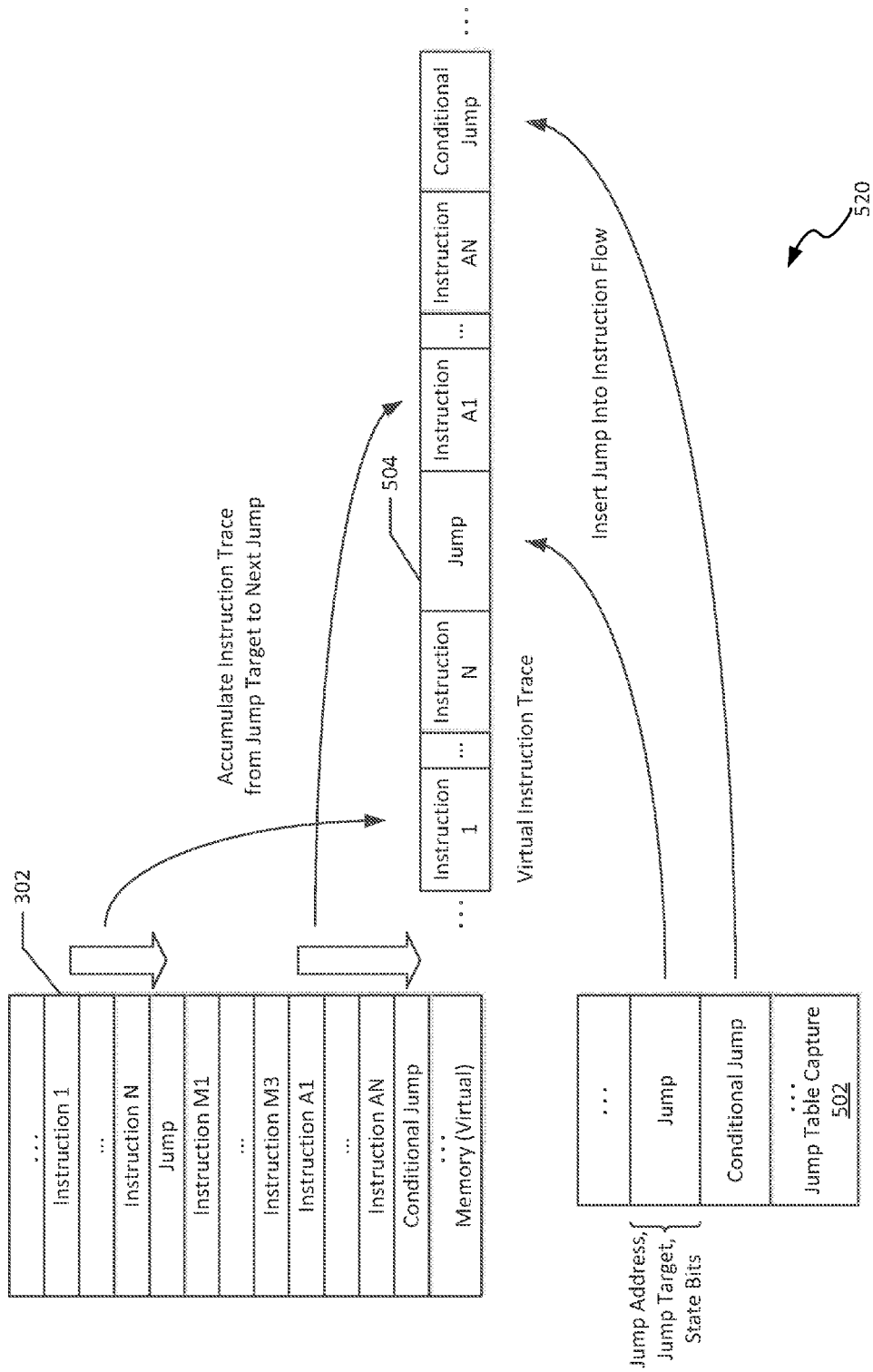
FIG. 5B is a logical data flow of a system for generating an instruction trace of virtualized instructions, according to a second example embodiment of the present disclosure.
Figure 5C:
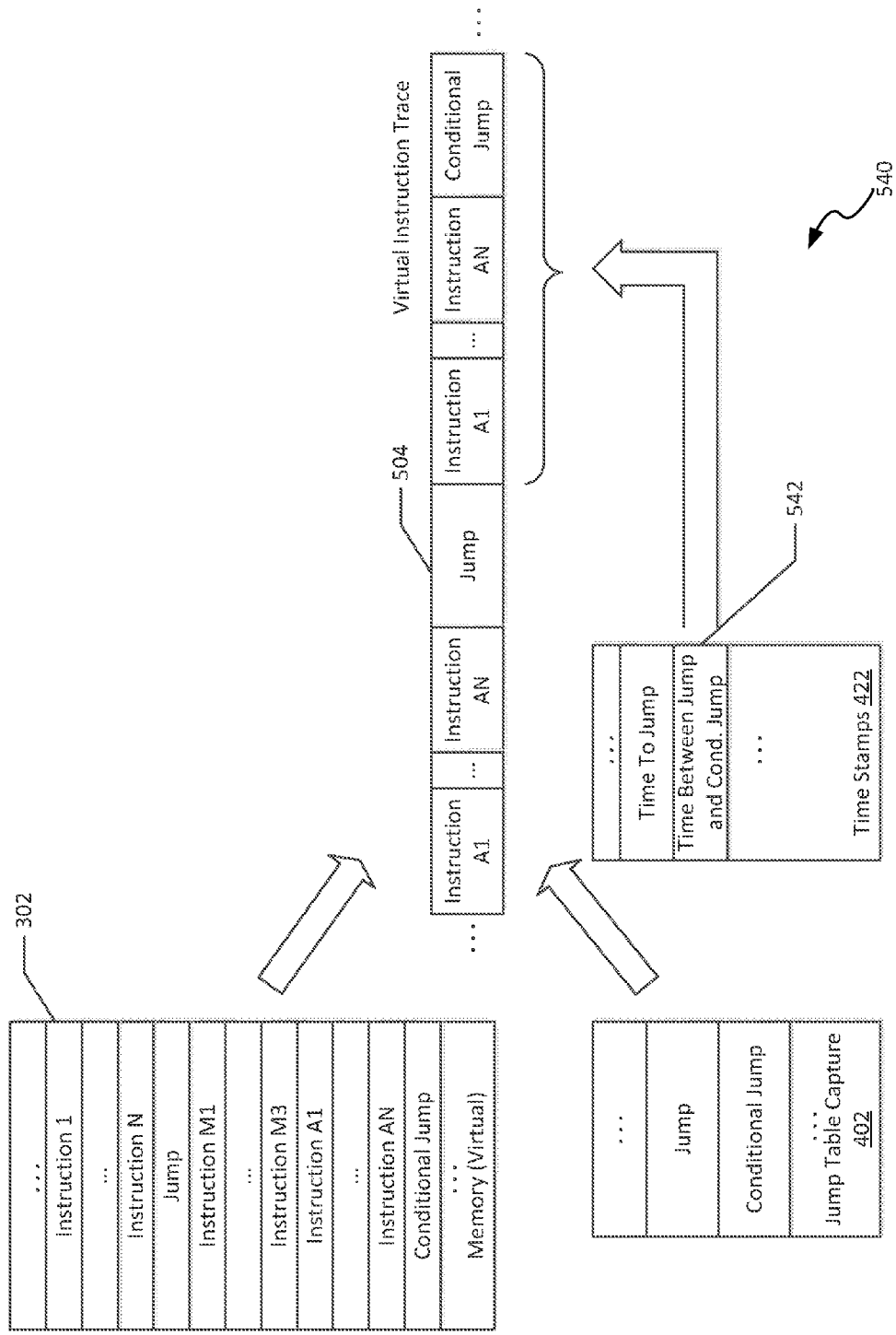
FIG. 5C is a logical data flow of a system for generating an instruction trace of virtualized instructions incorporating execution statistics, according to an example embodiment of the present disclosure.

Referring to FIGS. 5A-5C, additional example data flows are illustrated that can be used to generate an instruction count or instruction trace of non-native instructions that are emulated in a native computing system. The data flows of FIGS. 5A-5C also generally operate at least in part within virtualization software, and access both the instructions 302 and at least data from the jump table 402.

As illustrated in FIG. 5A, a first data flow 500 depicts reconstruction of an example virtual instruction trace useable to view flow of the non-native instructions during execution. Generally, the data flow 500 can be performed after emulated execution of the non-native software has completed, and is performed using a separate thread from the main emulator thread of the virtualization software; this is because adding an instruction to capture the non-native instruction being emulated may incur overhead during realtime translation, and may not be directly possible in the case of pretranslated code. In the example data flow shown, a jump table 402 has been sampled periodically, with jump table entries captured in jump storage 502. In this arrangement, each jump table entry 404 is captured in the jump storage, which represents a larger collection than a cyclically-overwritten jump table 402. The jump storage 502 is used to determine a location in the emulated, non-native code. Each jump table entry 404 captured in jump storage 502 can represent a jump history fragment, which could be a jump to a particular address in the non-native address space (e.g., a jump to a physically larger address), a buffer boundary, or different bank. In the data flow 500, the instructions 302 are stored at a location where relative addresses can be determined; for example, this can be accomplished by dumping the virtual banks and operating system banks to tape or other static storage device associated with a computing system, thereby allowing later inspection of the instructions 302 and associated non-native addresses. By locating where in the instructions 302 each jump is located, the virtualization software can reference that location in the corresponding instructions 302 to locate a branch target.

Accordingly, the jump, extracted branch target, and detected non-native instruction sequence 302 can be used to generate instruction trace 504 for the portion of the instruction flow between those jump instructions. Analogously, a next entry in the jump storage 502 can be analyzed, and instructions back-traced to the address referenced in the previous jump instruction (i.e., the jump target of the prior jump table entry). These entries can then be counted to determine a number of non-native operators that have been performed between the jump instructions, and overall.

Referring now to FIG. 5B, a second data flow 520 is illustrated, depicting reconstruction of an example virtual instruction trace useable to view flow of the non-native instructions during execution in the case where jump targets are included in the jump table entries 404. In this example, the target of each jump can be captured in jump storage 502, and used from jump storage to determine a flow of instructions executed in the instructions 302. In this case, the parameters associated with those instructions need not be analyzed specifically for purposes of determining the sequence of instructions executed, since all jumps and jump targets are present in the jump storage 502. In this case, only the instructions included in the instruction trace 504 for instructions between the jumps are retrieved from the instructions 302 for inclusion in the instruction trace.

In a further alternative embodiment in which jump targets are altogether unknowable or otherwise incapable of being extracted from the instructions 302 after execution, it is possible to traverse the instructions backwards from each jump that is stored in the jump storage 502, thereby allowing at least a portion of the instruction trace 504 to be generated. It is noted that in such an example, only a portion of the trace may be reconstructed, since it is unclear where branch targets, block boundaries, or other instructions representing the first instruction after a jump may be located within the instructions 302.

Referring specifically to FIG. 5C, a third data flow 540 is illustrated in which statistics are correlated to the reconstructed instruction trace 504. Statistics from any of the variety of generated data arrangements of FIGS. 4B-4D can be used. In the example embodiment shown, time stamp array 422 is illustrated. In this example, the time stamp array entry that corresponds to the jump table entry 404 is associated with the one or more non-native instructions, thereby associating an execution time with the one or more non-native instructions. Depending upon the sample rate of the performance monitoring thread of the virtualization software, as well as the number of instructions between jumps in the non-native instructions, statistics can be associated with the instruction trace at differing granularities. It is noted that the instruction trace 504 of FIG. 5C could be generated using any of the embodiments discussed above in connection with FIGS. 5A-5B.

Using the tables captured as illustrated in FIGS. 4A-4D, and optionally the instruction tracing and/or instruction counts illustrated in connection with FIGS. 5A-5C, it is noted that various types of analyses can be performed on the non-native instructions that are emulated by a native computing system. This is because, by use of the jump instructions acting as "flags" within an instruction stream, native execution statistics can be correlated to the non-native, or virtual instructions included in the virtual instruction sequence 306. For example, if timestamps in the time stamp array 422 are correlated to the non-native instructions between jumps as illustrated in FIG. 5C, execution time can be associated with an instruction trace and/or instruction count. Similarly, if other statistics are used, such as the instruction count array 442, or table 462 of native performance counters, other metrics could be established, such as events per non-native instruction, events per native instruction, native instructions per non-native instruction, native clock cycles per non-native instruction, or other metrics.

For use in various performance reports, the above and other statistical measures of non-native instructions can be captured, such as a frequency of jump instructions occurring, number of non-native instructions per jump, percentage of instructions executed from various memory banks, and time in various emulator states (e.g., in a statically pre-translated bank versus in a dynamically translated bank). Additionally, statistics of a processor can be captured and isolated to a non-native instruction sequence, such as instructions executed (retired), number of cache hits, cache hit percentages, native processor cycles per instruction, native cache misses per instruction, and timestamps that allow total execution time of each instruction or group of instructions. These metrics can also be cross-correlated to the non-native instructions to determine time and number of native instructions per non-native instruction, non-native jump, or other division.

Figure 6:
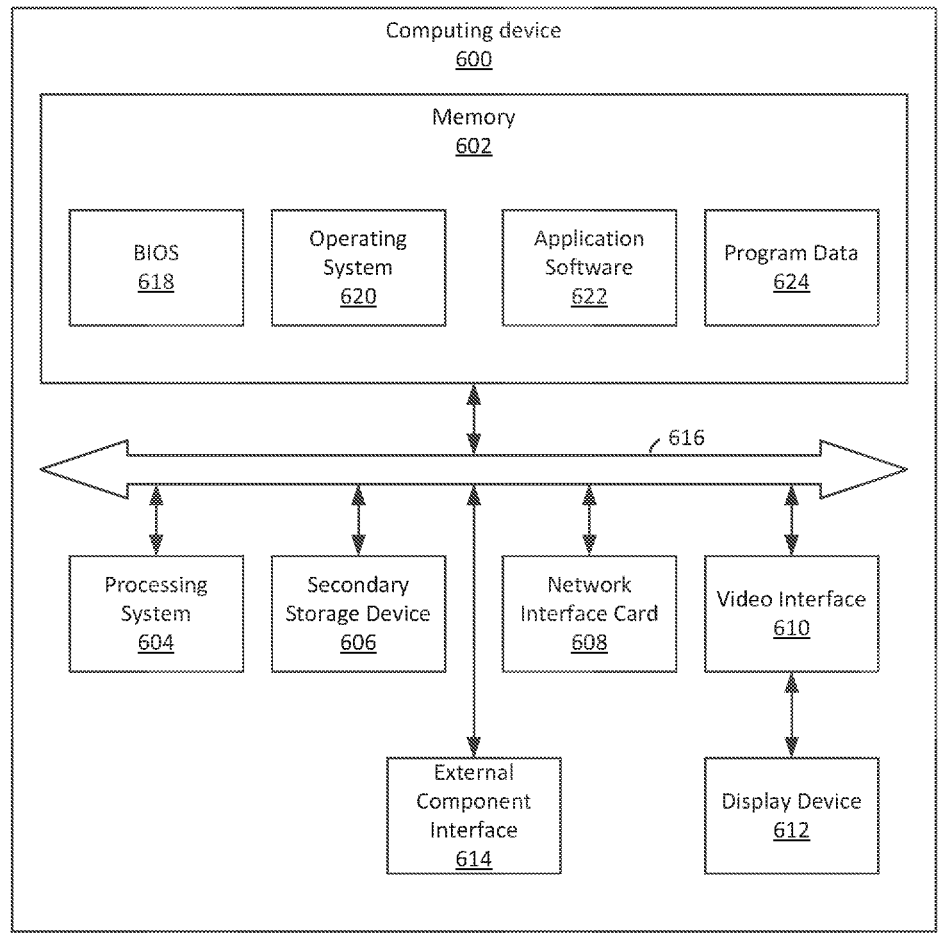
FIG. 6 is a block diagram of an electronic computing device in which aspects of the present disclosure can be implemented.

Referring now to FIG. 6, a block diagram illustrating an example computing device 600 is shown, which can be used to implement aspects of the present disclosure. In particular, the computing device 600 can represent a native computing device, such as the hardware 102 of FIG. 1, and can be used to execute any of the methods or implement any of the systems discussed herein.

In the example of FIG. 6, the computing device 600 includes a memory 602, a processing system 604, a secondary storage device 606, a network interface card 608, a video interface 610, a display unit 612, an external component interface 614, and a communication medium 616. The memory 602 includes one or more computer storage media capable of storing data and/or instructions. In different embodiments, the memory 602 is implemented in different ways. For example, the memory 602 can be implemented using various types of computer storage media.

The processing system 604 includes one or more processing units. A processing unit is a physical device or article of manufacture comprising one or more integrated circuits that selectively execute software instructions. In various embodiments, the processing system 604 is implemented in various ways. For example, the processing system 604 can be implemented as one or more processing cores. In another example, the processing system 604 can include one or more separate microprocessors. In yet another example embodiment, the processing system 604 can include an application-specific integrated circuit (ASIC) that provides specific functionality. In yet another example, the processing system 604 provides specific functionality by using an ASIC and by executing computer-executable instructions.

The secondary storage device 606 includes one or more computer storage media. The secondary storage device 606 stores data and software instructions not directly accessible by the processing system 604. In other words, the processing system 604 performs an I/O operation to retrieve data and/or software instructions from the secondary storage device 606. In various embodiments, the secondary storage device 606 includes various types of computer storage media. For example, the secondary storage device 606 can include one or more magnetic disks, magnetic tape drives, optical discs, solid state memory devices, and/or other types of computer storage media.

The network interface card 608 enables the computing device 600 to send data to and receive data from a communication network. In different embodiments, the network interface card 608 is implemented in different ways. For example, the network interface card 608 can be implemented as an Ethernet interface, a token-ring network interface, a fiber optic network interface, a wireless network interface (e.g., Wi-Fi, WiMax, etc.), or another type of network interface.

The video interface 610 enables the computing device 600 to output video information to the display unit 612. The display unit 612 can be various types of devices for displaying video information, such as a cathode-ray tube display, an LCD display panel, a plasma screen display panel, a touch-sensitive display panel, an LED screen, or a projector. The video interface 610 can communicate with the display unit 612 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 614 enables the computing device 600 to communicate with external devices. For example, the external component interface 614 can be a USB interface, a FireWire interface, a serial port interface, a parallel port interface, a PS/2 interface, and/or another type of interface that enables the computing device 600 to communicate with external devices. In various embodiments, the external component interface 614 enables the computing device 600 to communicate with various external components, such as external storage devices, input devices, speakers, modems, media player docks, other computing devices, scanners, digital cameras, and fingerprint readers.

The communications medium 616 facilitates communication among the hardware components of the computing device 600. In the example of FIG. 6, the communications medium 616 facilitates communication among the memory 602, the processing system 604, the secondary storage device 606, the network interface card 608, the video interface 610, and the external component interface 614. The communications medium 616 can be implemented in various ways. For example, the communications medium 616 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618 and an operating system 620. The BIOS 618 includes a set of computer-executable instructions that, when executed by the processing system 604, cause the computing device 600 to boot up. The operating system 620 includes a set of computer-executable instructions that, when executed by the processing system 604, cause the computing device 600 to provide an operating system that coordinates the activities and sharing of resources of the computing device 600. Furthermore, the memory 602 stores application software 622. The application software 622 includes computer-executable instructions, that when executed by the processing system 604, cause the computing device 600 to provide one or more applications. The memory 602 also stores program data 624. The program data 624 is data used by programs that execute on the computing device 600.

Although particular features are discussed herein as included within an electronic computing device 600, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data on a tangible medium. As such, computer storage media, as the term is used herein, are not generally constructed exclusively from transitory wired or wireless signals, but rather include some type of tangible storage medium. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
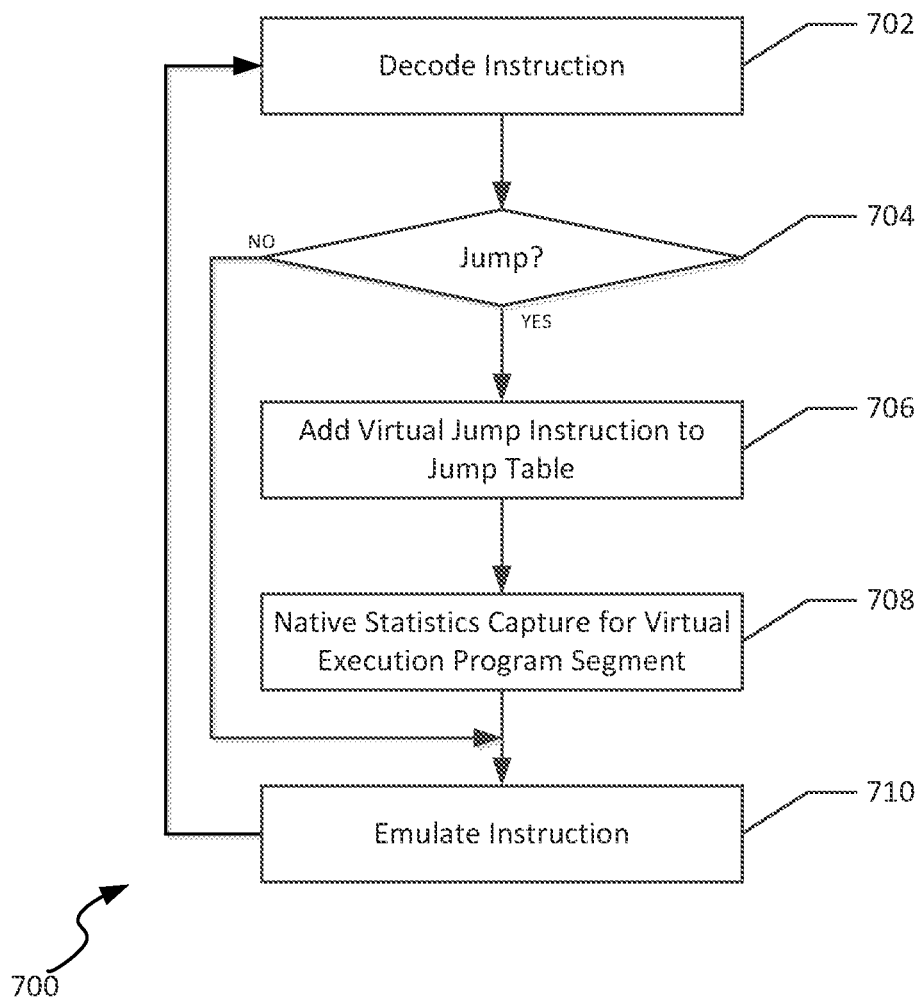
FIG. 7 is a flowchart illustrating example methods for capturing data indicative of performance of execution of virtualized software instructions, according to example embodiments of the present disclosure.
Figure 8:
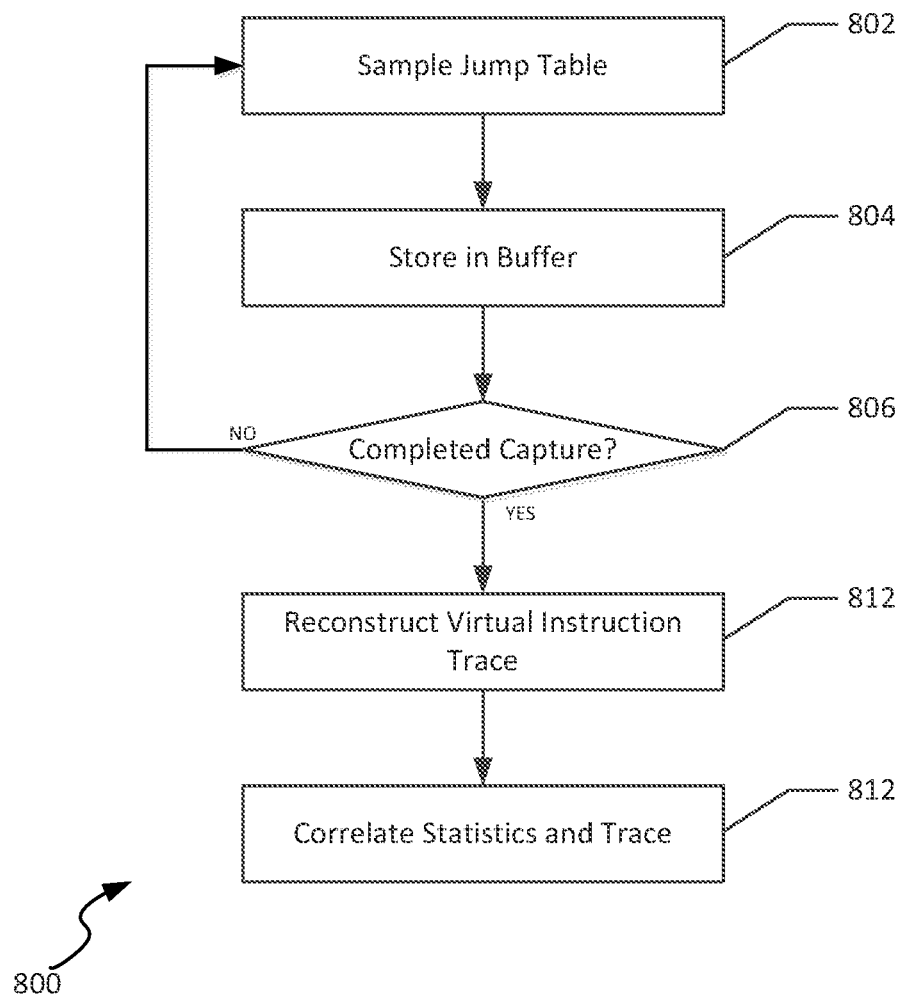
FIG. 8 is a flowchart illustrating further details of example methods for assessing performance of execution of virtualized software instructions, and establishing an instruction trace of such executed instructions, according to example embodiments of the present disclosure.
Figure 9:
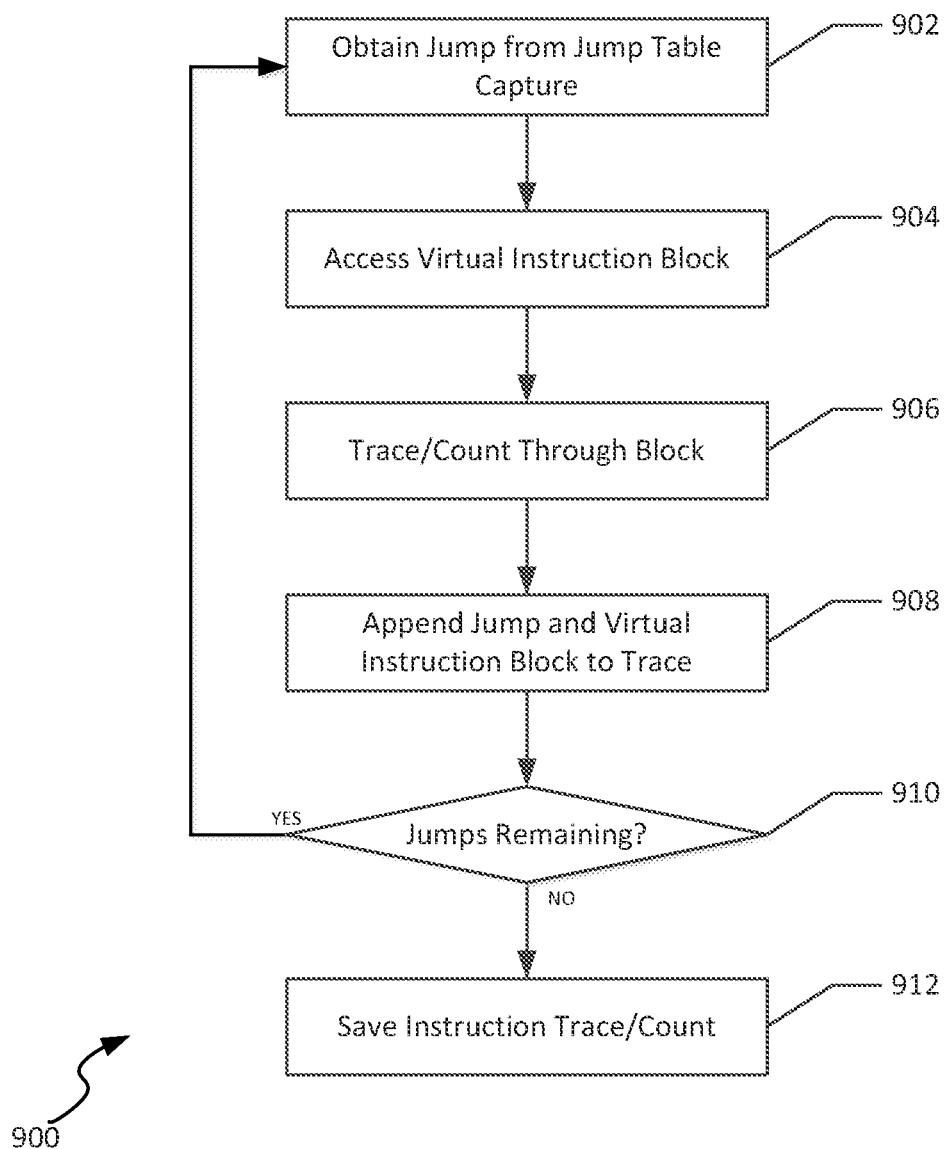
FIG. 9 is a flowchart illustrating an example method for reconstructing an instruction trace of virtualized software instructions, according to an example embodiment of the present disclosure.

Referring now to FIGS. 7-9, methods for assessing performance of execution of virtualized software instructions, and methods for reconstructing an instruction trace are illustrated. The methods of FIGS. 7-9 can be performed at least in part using the virtualization software according to the embodiments discussed above, and in some cases can result in the data flows illustrated above in connection with FIGS. 3, 4A-4D and 5A-5B.

Referring specifically to FIG. 7, an example method 700 is illustrated, in which virtualization software captures performance assessment metrics during execution of virtualized software instructions in a computing system. The method 700 generally is performed in a main thread within the virtualization software.

In the embodiment shown, a decode operation 702 is performed in which the virtualization software, such as software 218 of FIG. 2, obtains and decodes a current instruction operating in the portion of the virtualization software emulating the non-native software under analysis. The decode operation 702 generally determines an identity of a non-native instruction to be emulated by the virtualization software, such as whether the instruction corresponds to an arithmetic instruction, a logical instruction, a jump instruction, or some other type of instruction.

A jump assessment operation 704 determines whether the decoded instruction is a jump instruction. If the jump assessment operation 704 determines that a jump instruction is present, a jump table storage operation 706 captures the sampled information in a jump table 402, creating a new jump table entry 404.

In some embodiments, in particular those in which performance analysis is to be performed (beyond reconstruction of an instruction trace or non-native instruction count), a statistics capture operation 708 will also capture native statistics from the hardware system on which the non-native instructions are being emulated. This can include any of the variety of instructions previously discussed, captured in any of a variety of data structures, such as the time stamp array 422, instruction count array 442, or table 462 of native performance counters previously mentioned. In such embodiments, preferably each jump table entry 404 has an associated entry created in the corresponding statistical information data structure, such that performance information can be localized to a position in the non-native instruction sequence that falls between jump instructions.

An emulation operation 710 is then performed on the non-native instruction, thereby executing one or more corresponding native instructions to perform the operation defined by the non-native instruction. Following the emulation operation 710, a next instruction can be retrieved by the decode operation 702, and continued assessment, jump table and statistics capture, and emulated execution occurs during operation of the virtualization software.

Referring now to FIG. 8, a method 800 is shown for using the captured jump table and statistical information to assess performance of a computing system in executing the non-native instructions via the virtualization software 218. In the embodiment shown, the method 800 can be performed within the virtualization software 218, but within a separate thread from the method 700 of FIG. 7, and can, in some embodiments, be executed on entirely separate hardware resources, periodically receiving data from a portion of the virtualization software that emulates execution of the non-native instructions to be analyzed.

In the example embodiment of method 800 shown, a sample operation 802 samples the jump table 402 that is created during execution of at least a portion of the non-native software. In various embodiments, the sample operation 802 can occur at varying frequencies, but generally is sufficiently frequent to ensure that no jump operations are missed. The sample operation 802 aggregates jump table entries into jump storage, and also aggregates sampled statistics captured from native hardware regarding performance of the native system in executing the emulated instructions during that time. A storage operation 804 stores the jump table entries 404 and statistics in corresponding buffers (e.g., jump storage 502 and corresponding arrays described above).

A performance monitoring assessment operation 806 determines whether capture of desired statistics is complete. The assessment of executing non-native instructions may be deemed completed in the event of completion of execution of the non-native instructions, or based on receipt of user input indicating that performance analysis should be halted, or expiration of a predetermined period of time. In any event, if execution is not completed, operational flow returns to the sample operation 802, for continued sampling of the jump table 402 to detect additional jump instructions.

In the embodiment shown, if assessment is completed, operational flow proceeds to a reconstruction operation 812. The reconstruction operation 812 reconstructs an instruction trace of the non-native instructions that are executed, based on the jump table 402 and the source non-native instruction blocks 302. Examples of this data flow is illustrated above in connection with FIGS. 5A-5B. The reconstruction operation 812 can also optionally obtain a total non-native instruction count for each segment between jump instructions, as discussed above. A correlation operation 814 can also then be performed, to correlate any statistical information captured. For example, an instruction flow or instruction count can be associated with a particular elapsed time to determine a time required to emulate execution of a given number of non-native instructions, as illustrated in FIG. 5C. Of course, various other statistical measures could be correlated to the instruction trace, as previously discussed.

Referring now to FIG. 9, an example method 900 is shown for reconstructing an instruction trace of virtualized software instructions. The method 900 generally illustrates a detailed embodiment of a possible sequence for reconstructing an instruction trace after emulated execution of non-native instructions, as would be performed in the reconstruction operation 812 of FIG. 8.

In the embodiment shown, a jump entry retrieval operation 902 obtains an entry from the jump storage 502. Based on contents of that jump table entry, and in particular the virtual address 406, an access operation 904 accesses a virtual instruction block containing that jump instruction. An instruction tracing operation 906 traces from a current location, such as a previous jump target or a first executed instruction, in the instructions 302 (i.e., a recording of the non-native instructions on tape or other memory location) to the jump. The instruction tracing operation 906 records the non-native instructions traversed when tracing through the code block, and also optionally maintains a count of the non-native instructions traced. The jump and other traced instructions are then appended to an instruction trace (in order), and the instruction count is stored as well. If additional jump table entries 404 remain in the jump storage 502 (as determined by a jump table assessment operation 910), the jump entry retrieval operation 902 is repeated for the next entry (i.e., branching "yes" as illustrated in FIG. 9). If no additional jump entries remain in the jump table, the instruction trace and count are completed, and stored for analysis (via operation 912).

Referring to FIGS. 1-9 generally, it is noted that the arrangements discussed herein provide a number of advantages over existing performance monitoring and instruction trace approaches. In particular, because the systems and methods discussed herein are designed to work on a sampling basis rather than directly within the same system that is emulating virtual instructions, the overhead for capturing performance statistics is greatly reduced. Additionally, the amount of data that is required to be stored during execution is reduced; where in typical implementations an instruction trace is captured during execution, the present methods and systems avoid the overhead of consistent storage of such instruction records, and are limited to cases where flow control cannot be reconstructed after-the-fact (i.e., at jump locations). Furthermore, and more generally, the methods and systems discussed herein allow a user to test one, or more than one, non-native instructions for its performance, and also allow for testing performance of groups of non-native instructions, to detect cases where such instructions may cause conflicts or other issues during emulation on the native hardware that would not be present if the non-native instructions were executed within their own native environment. Various other advantages are apparent as well, as discussed above.

The above specification, examples and data provide a complete description of the manufacture and use of the composition of the invention. Since many embodiments of the inven-

The invention claimed is:

1. A method of tracing an emulated execution order of non-native instructions based on natively executing code on a computing system having a native instruction set architecture, the method comprising:
during emulated execution of non-native program code, maintaining a jump history in the computing system, the jump history including a listing of non-native jump instructions for which execution is emulated in the computing system, wherein the one or more non-native instructions are included in a virtual instruction block, and wherein the non-native jump instruction is included in the virtual instruction block as a last instruction in the virtual instruction block; and
for each of the non-native jump instructions included in the jump history:
accessing non-native program code including the non-native instructions to determine one or more non-native instructions executed between the non-native jump instruction and a last-executed non-native jump instruction; and
aggregating the non-native jump instruction and the one or more non-native instructions into an instruction trace.

2. The method of claim 1, wherein the jump history comprises jump instructions captured in an emulated jump table.

3. The method of claim 1, wherein the instruction trace approximates a sequence of non-native instructions in execution order.

4. The method of claim 1, wherein the nonnative program code is segmented into a plurality of virtual instruction blocks.

5. The method of claim 4, wherein each of the plurality of virtual instruction blocks is segmented based at least in part on locations of non-native jump instructions and jump targets included in the non-native program code.

6. The method of claim 4, wherein the jump history is stored in a jump table managed by virtualization software.

7. The method of claim 1, wherein the virtualization software comprises a non-native instruction translator.

8. The method of claim 1, wherein the instruction trace represents an order of intended execution of the non-native program code.

9. The method of claim 1, wherein the one or more non-native instructions are incapable of native execution on the computing system.

10. The method of claim 1, further comprising, during emulated execution of the non-native program code, capturing native statistics regarding execution of the native instructions that correspond to the non-native program code.

11. The method of claim 10, further comprising, after emulated execution of the non-native program code, correlating the native statistics to the instruction trace of the one or more non-native instructions.

12. An apparatus, comprising:
a memory;
a first mass storage device; and
a processor coupled to the memory, and coupled to the mass storage device, in which the processor is configured:
to trace an execution order of non-native instructions based on natively executing code on a computing system having a native instruction set architecture;
to maintain a jump history including a plurality of non-native jump instructions in emulated execution order, wherein the one or more non-native instructions are included in a virtual instruction block, and wherein the non-native jump instruction is included in a virtual instruction block as a last instruction in the virtual instruction block; and
to execute virtualization software, executing natively on the computing system, the virtualization software configured to, for each of the plurality of non-native jump instructions, access non-native program code including the non-native instructions to determine one or more non-native instructions executed between the non-native jump instruction and a last-executed non-native jump instruction, and aggregate the non-native jump instruction and the one or more non-native instructions into an instruction trace.

13. The apparatus of claim 12, wherein the jump history is stored in a jump table managed by virtualization software.

14. The apparatus of claim 12, wherein the virtualization software comprises a translation software system.

15. The apparatus of claim 12, wherein the virtualization software comprises an emulator.

16. The apparatus of claim 12, wherein the non-native instructions are included in non-native program code, the non-native program code separated into a plurality of non-native instruction blocks.

17. The apparatus of claim 16, wherein the virtualization software is configured to combine hardware-generated execution statistics with the instruction trace to determine performance in executing each of the one or more non-native instruction blocks.

18. A non-transitory computer-readable medium comprising computer-executable instructions which, when executed on a computing system cause the computing system to perform a method of tracing an emulated execution order of non-native instructions based on natively executing code on a computing system having a native instruction set architecture, the method comprising:
during emulated execution of non-native program code, maintaining a jump history in the computing system, the jump history including a listing of non-native jump instructions for which execution is emulated in the computing system, wherein the non-native program code is segmented into a plurality of virtual instruction blocks, wherein each of the plurality of virtual instruction blocks is segmented based at least in part on locations of non-native jump instructions and jump targets included in the non-native program code; and
for each of the non-native jump instructions included in the jump history:
accessing non-native program code including the non-native instructions to determine one or more non-native instructions executed between the non-native jump instruction and a last-executed non-native jump instruction; and
aggregating the non-native jump instruction and the one or more non-native instructions into an instruction trace.

19. A method of tracing an emulated execution order of non-native instructions based on natively executing code on a computing system having a native instruction set architecture, the method comprising:
during emulated execution of non-native program code, maintaining a jump history in the computing system, the jump history including a listing of non-native jump instructions for which execution is emulated in the computing system, wherein the one or more non-native instructions are included in a virtual instruction block, wherein the non-native program code is segmented into a plurality of virtual instruction blocks, wherein each of the plurality of virtual instruction blocks is segmented based at least in part on locations of non-native jump instructions and jump targets included in the non-native program code; and for each of the non-native jump instructions included in the jump history:

accessing non-native program code including the non-native instructions to determine one or more non-native instructions executed between the non-native jump instruction and a last-executed non-native jump instruction; and aggregating the non-native jump instruction and the one or more non-native instructions into an instruction trace.

20. The method of claim 19, further comprising, during emulated execution of the non-native program code, capturing native statistics regarding execution of the native instructions that correspond to the non-native program code.

* * * * *